US009436486B2

(12) United States Patent
Deshmukh et al.

(10) Patent No.: US 9,436,486 B2
(45) Date of Patent: Sep. 6, 2016

(54) SYSTEM AND METHOD FOR CONFIGURING AND EXECUTING SERVICES

(71) Applicant: Tata Consultancy Services Limited, Mumbai, Maharashtra (IN)

(72) Inventors: Veena S. Deshmukh, Maharashtra (IN); Rahul Ramesh Kelkar, Maharashtra (IN); V. V. L. Sudha Kancharla, Maharashtra (IN); Mudit Dhagat, Maharashtra (IN)

(73) Assignee: Tata Consultancy Services Limited (IN)

( * ) Notice: Subject to any disclaimer, the term of this patent is extended or adjusted under 35 U.S.C. 154(b) by 81 days.

(21) Appl. No.: 14/542,868

(22) Filed: Nov. 17, 2014

(65) Prior Publication Data

US 2015/0143090 A1 May 21, 2015

(30) Foreign Application Priority Data

Nov. 15, 2013 (IN) .......................... 3241/MUM/2013

(51) Int. Cl.
*G06F 9/46* (2006.01)
*G06F 9/445* (2006.01)

(52) U.S. Cl.
CPC ................ *G06F 9/44505* (2013.01)

(58) Field of Classification Search
None
See application file for complete search history.

(56) References Cited

U.S. PATENT DOCUMENTS

| 8,402,473 B1* | 3/2013 | Becker ................ G06Q 10/067 719/313 |
| 2003/0120502 A1* | 6/2003 | Robb ..................... G06Q 30/04 705/34 |
| 2007/0265860 A1* | 11/2007 | Herrmann ............ G06Q 10/087 705/26.1 |
| 2009/0193433 A1 | 7/2009 | Maes |
| 2010/0293023 A1 | 11/2010 | Senan et al. |
| 2013/0117195 A1* | 5/2013 | Mohanty .............. G06Q 10/067 705/348 |

FOREIGN PATENT DOCUMENTS

EP 2498209 A1 9/2012

OTHER PUBLICATIONS

Systems and methods for configuring and performing operations in Service Management framework including services (TS), configuring tools specific to services and Multi-based management the tools wherein the tools may be configured by translating the configuration of the services. The method includes: configuring the OS and executing the OS which further comprises the steps of identification of a first OS and a first operation based on the configuration, routing a first message received, executing the first operation by the first OS, routing the first message to the first OS identified. The first operation is performed by invoking a first tool wherein the first tool may send the first message to the OS which further routes the first message to the OS with the first message eventually reaching the user via the TS. Similarly, a second operation may be performed by a second OS.

16 Claims, 5 Drawing Sheets

SYSTEM AND METHOD FOR CONFIGURING AND EXECUTING SERVICES

CROSS-REFERENCE TO RELATED APPLICATIONS

The present application claims priority to an Indian Provisional Patent Application No. 3241/MUM/2013, filed on Nov. 15, 2013, the entirety of which is hereby incorporated by reference.

FIELD OF THE INVENTION

The present disclosure relates to the field of information technology infrastructure production support. More particularly, the present disclosure relates to system(s) and method(s) for configuring and executing services in the information technology infrastructure.

BACKGROUND

Information Technology (IT) infrastructure production support comprises various operational services and technology services. The operational services may include event management, incident management, service request management, orchestration, provisioning etc. The operational services may span across various technology services. The technology services may include operating systems such as UNIX, Linux, and Windows, various Relational Database Management Systems (RDBMS) such as Oracle SQL server, various app servers, web servers and applications.

In general, the operational services need to be provided for each technology service. For example, the event management, the incident management needs to be provided using the technology service, such as UNIX. Typically, the operational services are offered by different tools. In order to provide interaction between two operational services, different tools may be integrated. The tools may belong to an organization using the operational services or to a contracted vendor who provides the operational services.

In a multivendor environment, different technology services and operations services are handled by different service providers. In the multivendor environment, there exist three entities. Firstly, organizations that need the services and may be outsourcing the services to another service provider. Secondly, a service vendor. Thirdly, tool vendors. The tools may be owned by the organization or the service vendor. The organizations are facing difficulties due to lack of flexibility with respect to selection of the service providers and the tool vendors in the currently prevailing scenario. For example, if the organization outsources a set of services to a service vendor and if the service vendor uses a set of tools that is integrated together, the organization may not be able to split the services between the vendors. The organizations may not be able to split the services as the tools might have been integrated with the services and splitting the services may disrupt business operations. Therefore, the organizations may get locked to the service vendor. As presented above, the tools may be owned by the organizations or the service vendors. If the tools or a tool suite is integrated, there is a lock-in with the tool vendor. There is no solution to address the difficulties faced by the organizations.

SUMMARY

This summary is provided to introduce concepts related to systems and methods for configuring and executing services and the concepts are further described below in the detailed description. As disclosed herein are systems and methods for configuring and executing services.

In one implementation, a method for configuring and executing services is disclosed. The method includes configuring a plurality of services and a plurality of technology services based on information stored in a knowledge repository. The plurality of services and the plurality of technology services correspond to a plurality of messages. The plurality of services include an event management, an incident management, an orchestration service and a provisioning service. The at least one service is configured for at least one technology service. The technology service includes at least one of an Oracle technology service and a Linux technology service. The configuration includes transformation, validation and operation data associated with each service, a service adapter and a tool associated with each service. Further, the configuration includes a plurality of operations to be performed by the each service by invoking the tool corresponding to each service. The method further includes receiving, by a processor, a first message. The method further includes identifying, by the processor, a first service associated with the technology service, and a first operation to be performed by the first service based on the configuration. The first service includes the event management or the incident management. The method further includes routing, by the processor, the first message to the first service identified. The method further comprises executing, by the processor, a first operation to be performed by the first service. The first operation is executed by invoking a first tool. The first tool is invoked based on the configuration. The method further includes receiving, by the processor, a second message from the first service based on execution. The method further includes identifying, by the processor, a second service, and a second operation to be performed by the second service corresponding to the second message based on the configuration. The second service includes the orchestration service, the incident management and a combination thereof. The orchestration service defines a workflow to execute the second operation. The method further includes routing, by the processor, the second message to the second service. The method further includes executing, by the processor, the second operation to be performed by the second service. The second operation is executed by invoking a second tool. The second tool is invoked based on the configuration.

In one implementation, a system for configuring and executing services is disclosed. The system includes a processor and a memory coupled to the processor. The processor is capable of executing program instructions stored in the memory. The processor executes the program instructions to configure a plurality of services and a plurality of technology services based on information stored in a knowledge repository. The plurality of services and the plurality of technology services correspond to a plurality of messages. The plurality of services includes an event management, an incident management, an orchestration service and a provisioning service. The at least one service is configured for at least one technology service. The technology service includes at least one of an Oracle technology service and a Linux technology service. The configuration includes transformation, validation and operation data associated with each service, a service adapter and a tool associated with each service. Further, the configuration comprises a plurality of operations to be performed by the each service by invoking the tool corresponding to each service. The processor further executes the program instructions to receive a first message. The processor further executes the program instructions to identify a first service associated with the technology service, and a first operation to be performed by the first service based on the configuration. The first service includes the event management, the incident management. The processor further executes the program instructions to route the first message to the first service identified. The processor further executes the program instructions to execute a first operation to be performed by the first service. The first operation is executed by invoking a first tool. The first tool is invoked based on the configuration. The processor further executes the program instructions to receive a second message from the first service based on execution. The processor further executes the program instructions to identify a second service, and a second operation to be performed by the second service corresponding to the second message based on the configuration. The second service includes the orchestration service, the incident management and a combination thereof. The orchestration service defines a workflow to execute the second operation. The processor further executes the program instructions to route the second message to the second service. The processor further executes the program instructions to execute a second operation to be performed by the second service. The second operation is executed by invoking a second tool. The second tool is invoked based on the configuration.

In one implementation, a non-transitory computer readable medium embodying a program executable in a computing device for configuring and executing services is disclosed. The program includes a program code for configuring a plurality of services and a plurality of technology services based on information stored in a knowledge repository. The plurality of services and the plurality of technology services correspond to a plurality of messages. The plurality of services includes an event management, an incident management, an orchestration service and a provisioning service. The at least one service is configured for at least one technology service. The technology service includes at least one of an Oracle technology service and a Linux technology service. The configuration includes transformation, validation and operation data associated with each service, a service adapter and a tool associated with each service. Further, the configuration includes a plurality of operations to be performed by the each service by invoking the tool corresponding to each service. The program further includes a program code for receiving a first message. The program further includes a program code for identifying a first service associated with the technology service, and a first operation to be performed by the first service based on the configuration. The first service includes the event management, the incident management. The program further includes a program code for routing the first message to the first service identified. The program further comprises a program code for executing a first operation to be performed by the first service. The first operation is executed by invoking a first tool. The first tool is invoked based on the configuration. The program further includes a program code for receiving a second message from the first service based on execution. The program further includes a program code for identifying a second service, and a second operation to be performed by the second service corresponding to the second message based on the configuration. The second service includes the orchestration service, the incident management and a combination thereof. The orchestration service defines a workflow to execute the second operation. The program further includes a program code for routing the second message to the second service. The program further includes a program code for executing a second operation to be performed by the second service. The second operation is executed by invoking a second tool. The second tool is invoked based on the configuration.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to refer like/similar features and components.

DETAILED DESCRIPTION

Figure 1:
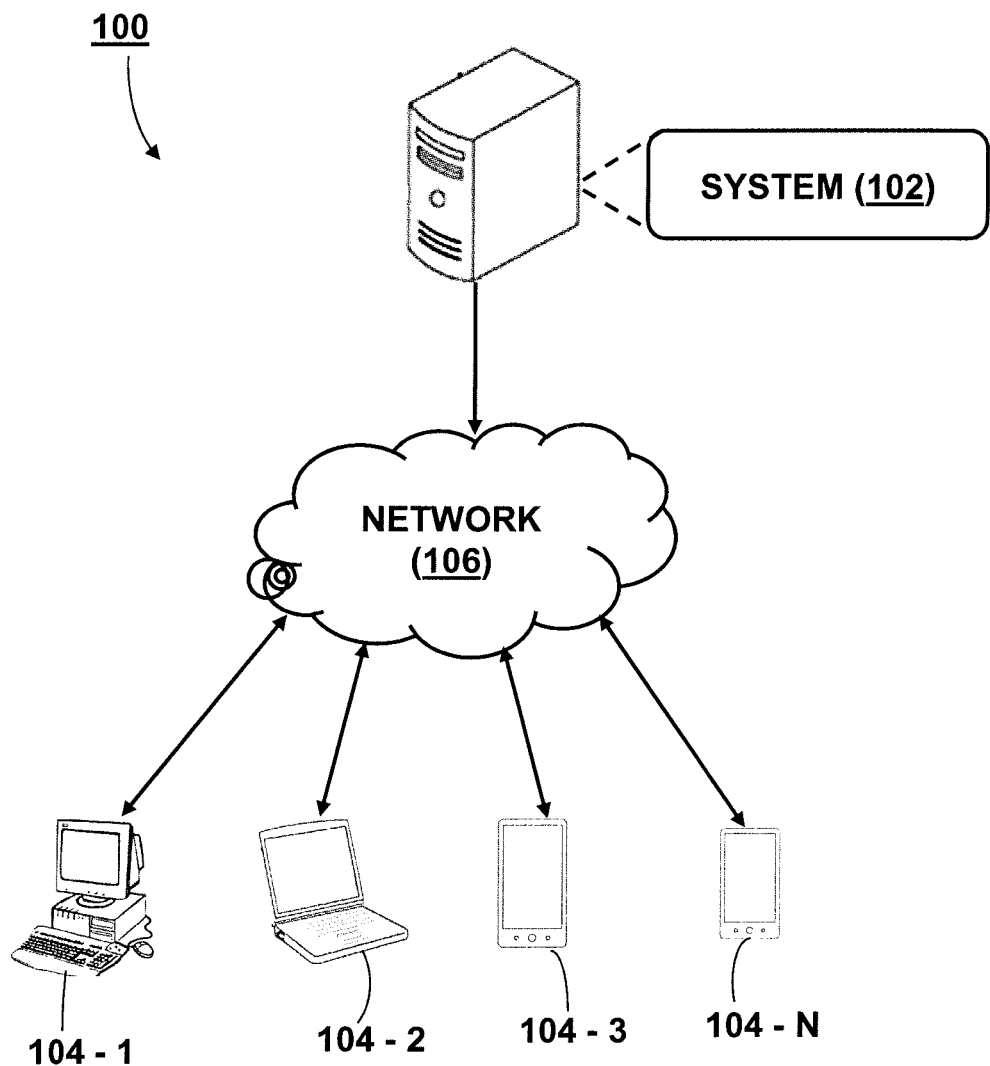
FIG. 1 illustrates a network implementation of a system for configuring and executing services, in accordance with an embodiment of the present disclosure.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. Disclosed are systems and methods for configuring and executing services. In order to execute services, at first, a plurality of services and a plurality of technology services are configured. The plurality of services/operational services and the plurality of technology services may be configured based on information stored in a knowledge repository. The plurality of services and the plurality of technology services may correspond to a plurality of messages. The at least one service is configured for at least one technology service. In one example, the plurality of services may comprise at least one of an event management, an incident management, an orchestration service and a provisioning service. In one example, the plurality of technology services may comprise an Oracle technology service and a Linux technology service. Each service may offer a specific type of operations. For example, an Incident Management service may offer service operations such as 'create Incident(MsgObj)', 'update incident(MsgObj)', getStatus(Incident ID). The Message object may have open key-value based structure and may contains the inputs relevant to service operation.

The configuration comprises transformation, validation and operation data associated with each service,a service adapter and a tool associated with each service. Further, the configuration comprises. Further, the configuration comprises a plurality of operations corresponding to each service to be performed by the each service by invoking the tool.

After configuring the services, in order to execute the services, a first message may be received via a user interface. Based on the configuration, a first service associated with the technology service, and a first operation to be performed by the first service based on the configuration may be identified. After identifying the first service and the first operation, the first message may be routed. The first message may be routed based on subscription by the first service. After routing the first message, a first operation of the plurality of operations may be executed by the first service. The first operation may be executed by invoking a first tool based on the configuration. Subsequently, a second message may be received from the first service based on execution. The second message may comprise a status indicating completion of the first operation. Subsequently, a second service, and a second operation to be performed by the second service corresponding to the second message may be identified based on the configuration. The second service may comprise the orchestration service. The orchestration service may define a workflow to execute the second operation.

After identifying the second service and the second operation, the second message may be routed the second service. Subsequently, the second operation to be performed may be executed by the second service. The second operation may be executed by invoking a second tool. The second tool may be invoked based on the configuration. After executing the second operation, a status indicating completion of the second operation may be sent to the user.

The service or technology service may perform the operations specified in the message using a tool and may send results of the message to the router. After resolving the message in the tool, an orchestration service may execute required procedure on the message. The orchestration service may subscribe to the router to receive messages. Upon execution, the orchestration service may send the message with results to the router. Subsequently, the router may route the message to the operational service. Further, the operational service may set the message as closed. Subsequently, the operational service may send the message to the technology service. After receiving the message, the technology service may send the message to the user via the user interface.

While aspects of described system and method for configuring and executing services may be implemented in any number of different computing systems, environments, and/or configurations, the embodiments are described in the context of the following exemplary system.

Referring now to FIG. 1, a network implementation 100 of a system 102 for configuring and executing services is illustrated, in accordance with an embodiment of the present disclosure. Although the present disclosure is explained by considering a scenario that the system 102 is implemented as an application on a server. It may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2, 104-3, and 104-N, collectively referred to as user devices 104 hereinafter, or applications residing on the user devices 104.

Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
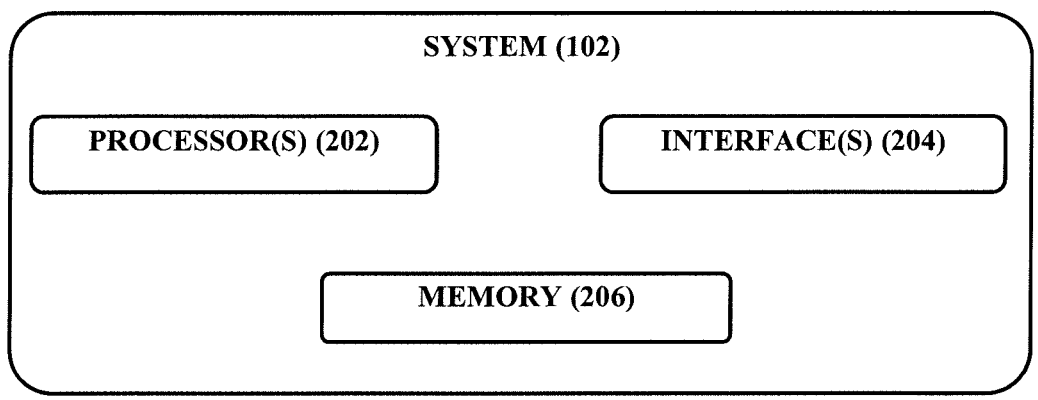
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, an Application Program Interface (API) and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, at first, a user may use the client device 104 to access the system 102 via the I/O interface 204. The working of the system 102 may be explained in detail using FIG. 2, FIG. 3, and FIG. 4 explained below. The system 102 may be used for configuring and executing services. In order to configure and execute services, the system 102 may provide a service integration framework for operational services and technology services.

Figure 3:
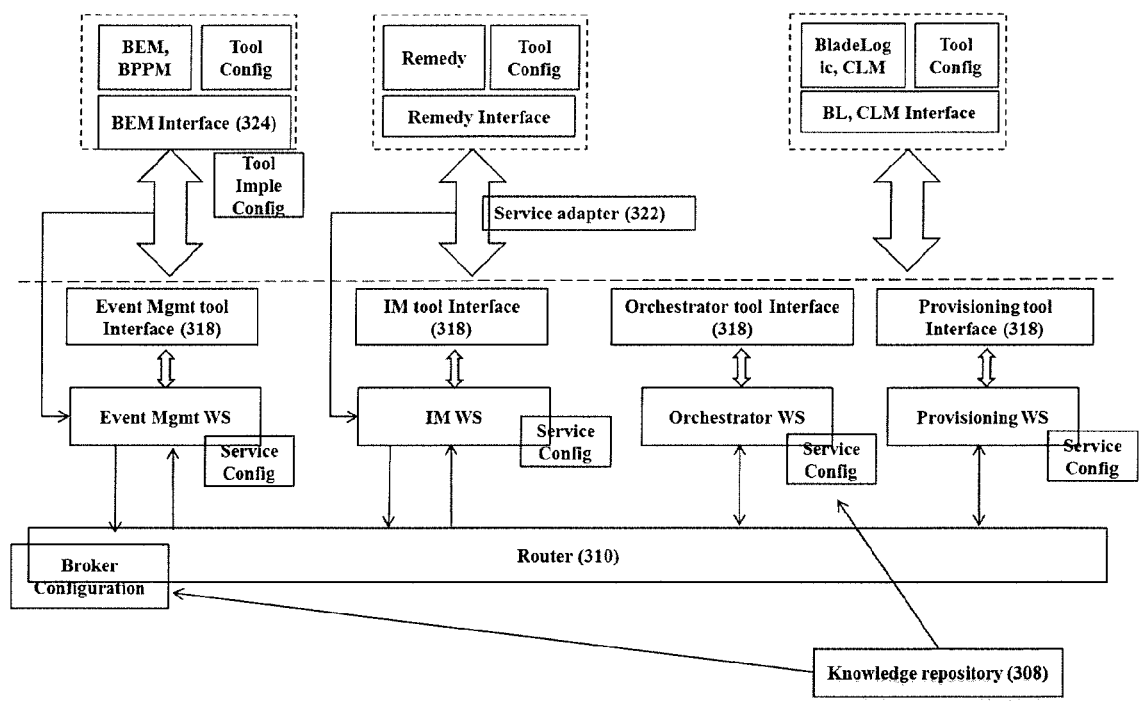
FIG. 3 and FIG. 4 illustrate a framework of the system, in accordance with an embodiment of the present disclosure.
Figure 4:
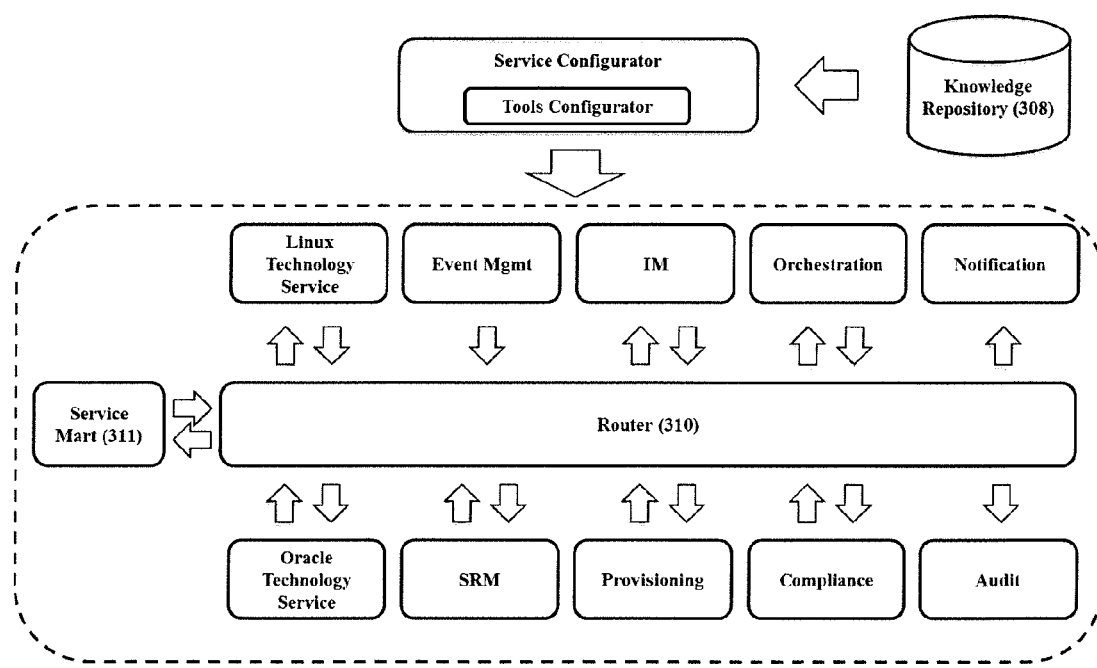

At first, the system 102 may configure a plurality of the services and a plurality of technology services. In one implementation, the system 102 may configure the plurality of services and the plurality of technology services based on information stored in a knowledge repository 308. In order to explain the configuration of the plurality of services and the plurality of technology services, FIG. 3, and FIG. 4 may be used as an example. FIG. 3 and FIG. 4 illustrate the system 102 architecture comprising a framework to configure the services. Referring to FIG. 3, it may be observed that the framework comprises one or more layers showing various components. At level 1, the framework shows a router/service integration network 310. The router 310 may be accessed by using a service mart 311, as shown in FIG. 4. In one example, the service mart 311 may comprise a Graphical User Interface (GUI) to access the router 310. In one example, the service mart 311 may be a web interface.

In one implementation, the router 310 may interact with the plurality of services and a plurality of technology services. The at least one service may be configured for at least one technology service. In one implementation, the plurality of services may interact with each other through the router 310 in a publisher-subscriber model. The interaction between the plurality services may be asynchronous. Each service may have a service catalogue application program interface 318 at level 2. In one example, the plurality of services may comprise an event management, an incident management, an orchestration service and a provisioning service. The plurality of technology services may comprise an Oracle technology service and a Linux technology service. Each service and the technology service may be capable of sending the messages as per the operations associated with them. Further, each service and the technology service may expose a service catalogue application programme interface(API) 318. The service catalogue application program interface 318 for each service and the technology service may pertain to operations associated with the service and the technology service. For example, the incident management service may expose API for create incident and update incident. In another example, the orchestration service may expose API for start workflow. Each service may have an interface which may be used by other entities to invoke the operations of the service. In one example, the incident management service may have an Incident Management (IM) web interface 318. Similarly, the event management service may have an Event Management (EM) web interface 318. In one example, the service catalogue application program interface 318 may comprise a web service. In one example, the service catalogue application program interface 318 may be presented as a RESTful web service.

At level 3, the system 102 may comprise a service adapter 322. In one example, the service adapter 322 may act as an abstract tool interface for a tool. At level 4, the system 102 may comprise the tool specific interface 324 interacting with the service adapter 322.

To configure the plurality of services and the plurality of technology services, the system 102 may use the information stored in the knowledge repository 308. The plurality of services and the plurality of technology services may correspond to a plurality of messages. The message may comprise information of a source of the message, intended operation to be performed, parameters in a form of key-value pairs, and a payload required. Further, the message may have a message object. The message object may have an open key-value based structure and may contain inputs relevant to an operation to be performed.

A service of the plurality of services may subscribe to the system 102 to receive the message. For example, the service may subscribe to the message based on a type of message. For example, the incident management service may subscribe to the operations such as create Incident(MsgObj), update incident(MsgObj), and getStatus(Incident ID). Further, the plurality of services may be configured for a technology service. The technology service may comprise the Oracle technology service and the Linux technology service. In one example, the incident management service may be associated with the Linux technology service. In another example, the event management service may be associated with the Linux technology service. Similarly, one or more services may be associated with the Oracle technology service. In one implementation, the technology service may subscribe to the system 102 to receive the message. For example, the technology service may subscribe to the message based on a category of the message, a type of the message, an item and a summary, corresponding to the message.

In one implementation, the plurality of services and the plurality of technology services may be configured based on data associated with each service corresponding to transformation, validation and operation data associated with each service, a service adapter and a tool associated with each service. Further, the configuration comprises a plurality of operations corresponding to each service to be performed by the each service by invoking the tool. As discussed, the plurality of services may correspond to the plurality of messages. For every message, the data required corresponding to configuration may be checked. As presented above, each service may subscribe to the message based on the type of the message. For the message, the data corresponding to transformation required may be configured. Further, for each data field, corresponding values required to validate the data may be configured. Similarly, the service adapter for each service that may act as a medium between the service and the tool may be configured. Further, the information corresponding to the tools that may be invoked too perform the operations for each service may be configured.

In one implementation, each service may subscribe to the router 310 to consume the message. For example, a service may subscribe to a message based on the type of the message that may be consumed by the service. The service may consume the message by specifying a location such that the message may be routed to the location. For example, the incident management service may subscribe to the message NewEvenCreated. Likewise, each operational service may subscribe to the router 310 such that when a message is received, the router 310 may have knowledge of the operational service which may cater to the message.

Similarly, a technology service may subscribe to consume the message. For example, the Linux technology service may subscribe to the message based on type of message e.g., Linux service request. Likewise, each technology service may subscribe to the router 310 such that when a message is received, the router 310 may have knowledge of the service and the technology service which may cater to the message.

Further, the configuration may comprise a plurality of operations required to perform corresponding to each service. In order perform the plurality of operations; each service may have to invoke one or more tools. Based on the subscription, the information pertaining to each service invoking a tool to perform a plurality of operations may be stored in the configuration. In one example, the tools may comprise BEM, Bladelogic, BPPM, CLM and Remedy. In one implementation, the system 102 may store the information pertaining to the configurations in the knowledge repository 308. In one implementation, the knowledge repository 308 may be comprised in the memory 206. In another implementation, the knowledge repository 308 may be comprised in an external database (not shown).

After configuring the services, the services may be executed. In order to execute the services, the system 102 may receive a first message. The first message may comprise information of the source of the message, intended operation to be performed, parameters in the form of key-value pairs, and the payload required. In one implementation, the system 102 may receive the first message using a service mart 311, as shown in FIG. 4. In one example, the service mart 311 may be a web interface. After receiving the first message, the message may be consumed by the technology service. Based on the first message, consider the first message received is of the type of message e.g., Linux service request; the Linux technology service may be identified. The Linux technology service may send the first message to the router 310. The technology service may send the first message with information corresponding to a category of the message, type of the message, an item of the message and summary of the message (CTIS). For example, the technology service may send the information as shown in Table 1.

TABLE 1

Table 1: CTIS

| Category | Type | Item | Summary |
|---|---|---|---|
| Infra-structure Services-Linux | Linux-Issues | FTPIssue | FTPIssue |
| Infra-structure Services-Linux | Linux-Service Request | UserCreation | UserCreation |
| Blade | Provi-sioning | Provi-sioning | BLCLI_LinuxRHELProvision |
| Unknown Service | Linux RHEL aaS | Virtualization Management | BladeLogic Automated Provisioning |

The router 310 may comprise a router listener (not shown) to receive the first message from the technology service. After receiving the first message, the router listener may add the first message in a queue. Subsequently, the router 310 may process the first message in order of arrival in the queue.

Corresponding to the CTIS of the first message, the system 102 may identify a first service from the plurality of services based on the configuration. As discussed, each service may have subscribed to consume the plurality of messages and such configuration information may be stored. In one implementation, the router 310 may identify the first service. The first service may comprise incident management service and event management. Consider the incident management service subscribed to consume the first message. Based on the configuration, the router 310 may identify that the incident management service is subscribed to consume the first message. After identifying the first service, the router 310 may validate the first message corresponding to the configuration. For example, the router 310 may validate the operation data received corresponding to the first message. Further, the router 310 may validate the data values corresponding to data fields in the configuration.

Subsequently, the router 310 may route/direct the first message to the incident management service. In order to explain the routing of the first message, Table 2 may be used as an example. Specifically, Table 1 shows the router 310 configuration illustrating the routing of the first message.

TABLE 2

Table 2: Router configuration

| Message Type | Qname | URL | Base method | Method |
|---|---|---|---|---|
| MON_NewAlertCritical | IMService:RECV | http://localhost:8080/IncidentManagementWS/rest/ITSMRest | post | createIncident |
| MON_NewAlertNonCritical | ServiceDeskQ | ServiceDesk | post | createTicket |
| Service_Notify | Notify:RECV | http://localhost:8080/NotifyWS/rest/NotifyRest | post | sendNofication |
| IM_NewIncidentCreated | OR:RECV | http://localhost:8080/OrchestrationWS/rest/OrchestrationWS | post | startWorkFlow |

When the first message is received, the router 310 may check the type of the message. Corresponding to the type of the first message, the router 310 may identify the service that subscribed to receive the first message. Subsequently, the router 310 may identify the operations to be performed by the service corresponding to the message based on the configuration. Referring to Table 2, consider the type of the first message received is MON:newalertcritical. Based on the type of the first message, consider that the incident management service subscribed to receive the first message. The information corresponding to subscription may be retrieved from the configuration. After identifying the service, the operations that have to be performed may be identified from a method to be performed on the message. Consider for the above example, the operation to be performed is identified as create incident. Based on the service and the operation, the router may route the first message to a location subscribed by the service. The location information may be stored in a form of URL. For example, the location may be stored as http://localhost:8080/IncidentManagementWS/rest/ITSMRest. Based on the location, the first message may be routed to a first service to perform the operation.

For example, consider the first message comprises the operation e.g., create incident. The router 310 may route the first message to the incident management service. The router 310 may route the first message with the CTIS comprising parameters associated with the first message based on the configuration. The router 310 may route the first message by calling the first service. In one implementation, the router 310 may call the API of the first service to perform appropriate operation. After the first message is routed, the first service may receive the first message comprising a first operation to be performed by the first service based on the configuration. Upon receiving the first message, the first service may execute the first operation. For example, the first operation may comprise creating incident. In order to execute/perform the first operation, the first service may have to invoke a first tool. The first service may invoke the first tool based on the configuration.

In order to invoke the first tool, the configuration corresponding to the first service may have to be translated into the tool specific configuration. In order to explain the first service configuration, Table 3 may be used as an example. Specifically, Table 3 shows the configuration of the first service.

TABLE 3

Table 3: Configuration of the services

| gCategory | gType | gItem | gSummary | Params |
|---|---|---|---|---|
| Infrastructure Services-Linux | Linux-Issues | FTPIssue | FTPIssue | Hostname |
| Infrastructure Services-Linux | Linux-Service Request | UserCreation | UserCreation | UserName |
| Blade Unknown Service | Provisioning Linux RHEL aaS | Provisioning Virtualization Management | BLCLI_LinuxRHELProvision BladeLogic Automated Provisioning | config_file_xml config_file_xml |

The configuration of the first service may have to be translated such that the tool understands the configuration. In order to translate, the first service may interact with the tool via the service adapter 322. The service adapter 322 may map the configuration to a tool specific configuration. The mapping of the configuration to the tool specific configuration is illustrated in Table 4.

TABLE 4

Table 4: Translation of the configuration

| GCategory | GType | GItem | GSummary | Category | Type | Item | Summary |
|---|---|---|---|---|---|---|---|
| Infrastructure Services - Linux | Linux-Service Request | UserCreation | UserCreation | Infrastructure as a Service | Administration | New User Creation | New User Creation |
| Infrastructure Services - Windows | Windows-Service Request | UserCreation | UserCreation | Infrastructure as a Service | Administration | New User Creation | New User Creation |
| Infrastructure Services - Linux | Linux-Issues | FTPIssue | FTPIssue | Infrastructure Services-Linux | Linux-Issues | FTPIssue | FTPIssue |

After translating the configuration, the tool 324 may execute the first operation. For example, the first service identified is the incident management service and the first operation identified is creating user name. In order to create the user name, the incident management service may invoke Remedy tool 324. The configuration of the incident management service may be translated into the Remedy tool configuration. In order to illustrate the tool configuration, Table 5 may be used as an example. Specifically, Table 5 shows the Remedy tool configuration.

TABLE 5

Table 5: Remedy tool configuration

| Category | Type | Item | Summary | Params |
|---|---|---|---|---|
| Infrastructure Services-Linux | Linux-Issues | FTPIssue | FTPIssue | Hostname |
| Infrastructure Services-Linux | Linux-Service Request | UserCreation | UserCreation | UserName |
| Unknown Service | Linux RHEL aaS | Virtualization Management | BladeLogic Automated Provisioning | config_file_xml |
| Unknown Service | Oracle11g aaS | Virtualization Management | BladeLogic Automated Provisioning | config_file_xml |

In order to create the new user, the Remedy tool 324 may consider parameters associated with the configurations. Based on the configurations, the Remedy tool 324 may create the ticket i.e., using the CTIS as shown in Table 5. Although the example illustrates invoking the Remedy tool corresponding to the incident management service, it is apparent to persons skilled in the art to execute other operations by invoking other tools.

After the ticket is created in the Remedy tool 324, the first service i.e., incident management service may send a second message to the router 310. The first service may send the second message indicating completion of execution of the first operation. In one implementation, after creation of the user name in the tool, the Incident Management (IM) service may send the second message containing a ticket ID and details to the router 310. As discussed, one or more services may subscribe to the system 102 to consume the plurality of messages. In one implementation, a second service of the plurality of services may subscribe to consume the second message. The configuration of such second service may be stored in the knowledge repository 308. After receiving the second message, the router 310 may identify the second service corresponding to the second message based on the configuration. In one example, the second service may comprise the orchestration service. Based on the identification, the router 310 may route the second message to the second service i.e., the orchestration service.

For example, consider the first service identified is IM service to perform the first operation of create incident corresponding to the first message as shown in Table 2. Based on the first service identified, the router 310 may route the first message to IM service. In order to execute the first operation, the IM service may invoke Remedy tool. Upon executing the first operation, the IM service may send the second message indicating completion of the first operation to the router 310.

After the second message is routed, the second service may receive a second message. Based on the second message, the router 310 may identify the second service and a second operation to be performed by the second service based on the configuration. For example, consider the second message comprises that the IM service created new incident. For example, consider the orchestration service subscribed to receive the message type corresponding to created new incident. Based on the second message type, the router 310 may identify that the orchestration service subscribed to execute the operation corresponding to the second message. From Table 2, it may be observed that the operation to be performed is start workflow. After identifying the orchestration service and the second operation, the router 310 may route the second message to the orchestration service. The router 310 may make appropriate service operation call on the orchestration service. In order to execute/perform the second operation, the orchestration service may execute a plurality of workflows pre-defined based on the configuration. In one example, the orchestration service may invoke the second tool i.e., Bladelogic that connects to a remote host to execute the workflow. In order to invoke the second tool, the configuration corresponding to the second service may have to be translated into the tool specific configuration. The translation may be performed as explained above using Table 3. After the configuration is translated, the orchestration service may invoke the second tool to create the incident in the database.

Subsequent to the execution of the plurality of workflows, the orchestration service may send results based on the execution of the second operation corresponding to the second message. In one implementation, the orchestration service may send the results to the router 310. Further, the orchestration service may send a status message indicating that the second message is completed. After receiving the results, the router 310 may route the results and the status message to the first service e.g., the Incident Management (IM) service. Subsequently, the Incident Management (IM) service may set a status of the first message as closed and may send the results to the technology service e.g., the Linux technology service. Subsequently, the technology service may send the results to the service mart 311.

In one implementation, the Event Management (EM) service may receive the first message. After receiving the first message, the EM service may perform the first operation corresponding to the first message. For example, consider the first message comprises the first operation as create an alert. The EM service may execute the first operation and may create the alert by invoking a first tool. After the first operation is executed, the EM service may send the second message to the router 310 indicating that an alert has been created. The EM service may execute the first operation as explained in the description above.

After receiving the second message, the router 310 may identify the second service and the second operation corresponding to the subscription of the plurality of services. Based on the configuration, consider the incident management service is subscribed to execute the second operation e.g., create incident; the router 310 may make an appropriate call to the IM service. After identifying the IM service and second operation, the router 310 may route the second message to the IM service. The second operation may be executed using the description above. After execution of the second message, the IM service may send a third message to the router 310. Subsequently, the router 310 may identify a third service and a third operation corresponding to the subscription of the plurality of services. For example, consider the orchestration service subscribed to execute the third operation. The router 310 may route the third message to the orchestration service. The orchestration service may execute the plurality of workflows as explained above. Subsequently, the orchestration service may send the results to the router 310. Further, the orchestration service may send a status message indicating that the third message is completed. After receiving the results, the router 310 may route the results and the status message to the first service e.g., the Event Management (EM) service. Subsequently, the EM service may set a status of the first message as closed.

Although the system 102 is described as a standalone application implemented on a server or a standalone computing device, it may be apparent to those persons skilled in the art to implement each operational service, technology service, and router on two or more computing devices running simultaneously. Further, the tool may be implemented on an individual computing device. When the services run on different applications residing on two or more computing devices, each computing device may have respective at least one processor, at least one memory and at least one user interface to implement the system described herein.

The plurality of services, the plurality of technology services and the router 310 may be configured to provide Information Technology (IT) infrastructure production support with a knowledge repository. By configuring the plurality of services, the plurality of operations are vendor agnostic. In other words, the services may be configured without being dependent on the tools that are vendor specific. The plurality of services may be outsourced to different vendors/service providers. Further, by configuring the plurality of services, the tools required to execute the operations may be changed without difficulty. In order to change the tool, organizations may have to change the service adapter associated with the tool. Further, configuration of the plurality of services and the plurality of technology services facilitates in sustaining and maintaining of the Information Technology (IT) infrastructure production support.

Figure 5:
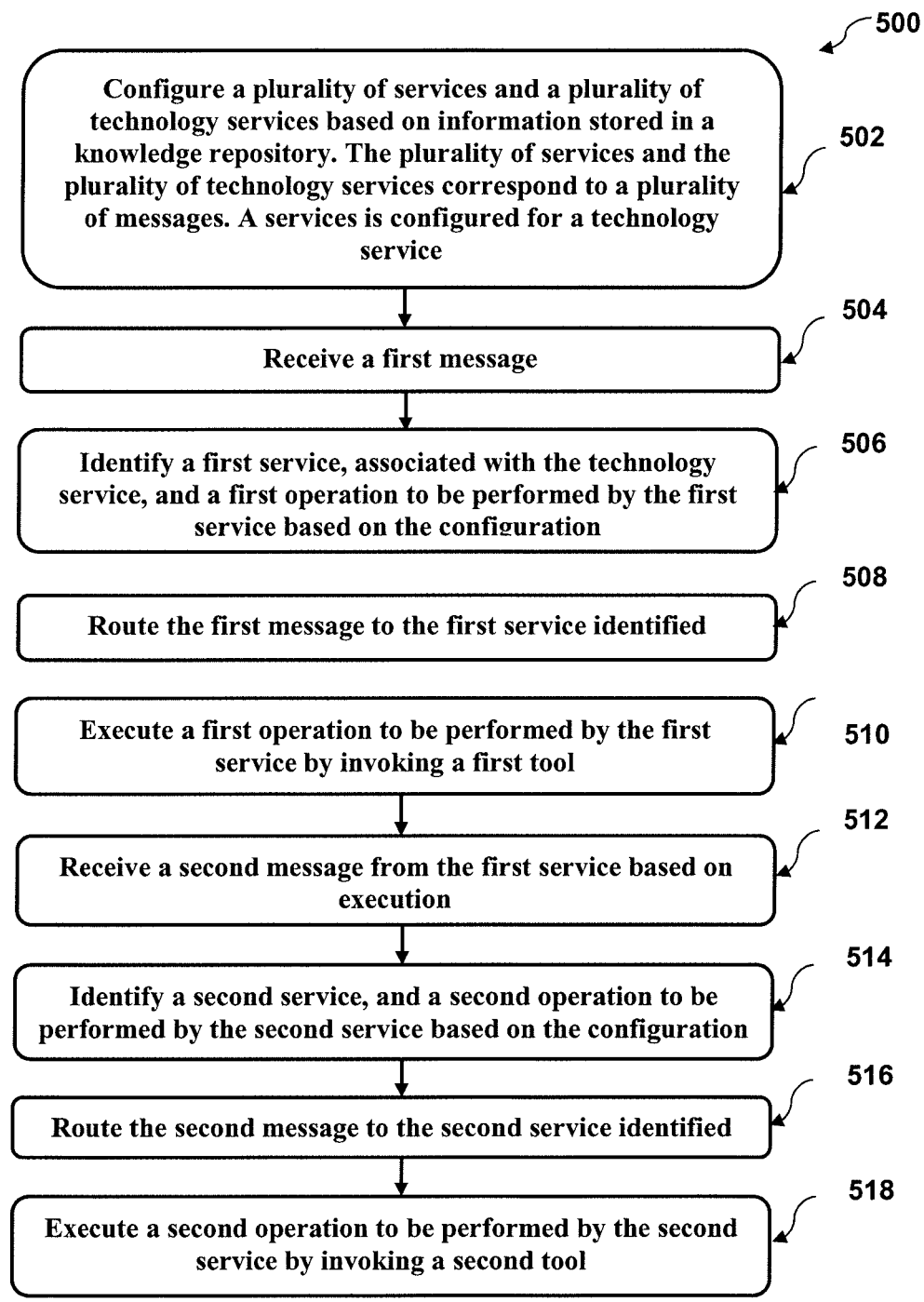
FIG. 5 illustrates a method for configuring and executing services, in accordance with an embodiment of the present disclosure.
Figure 1:
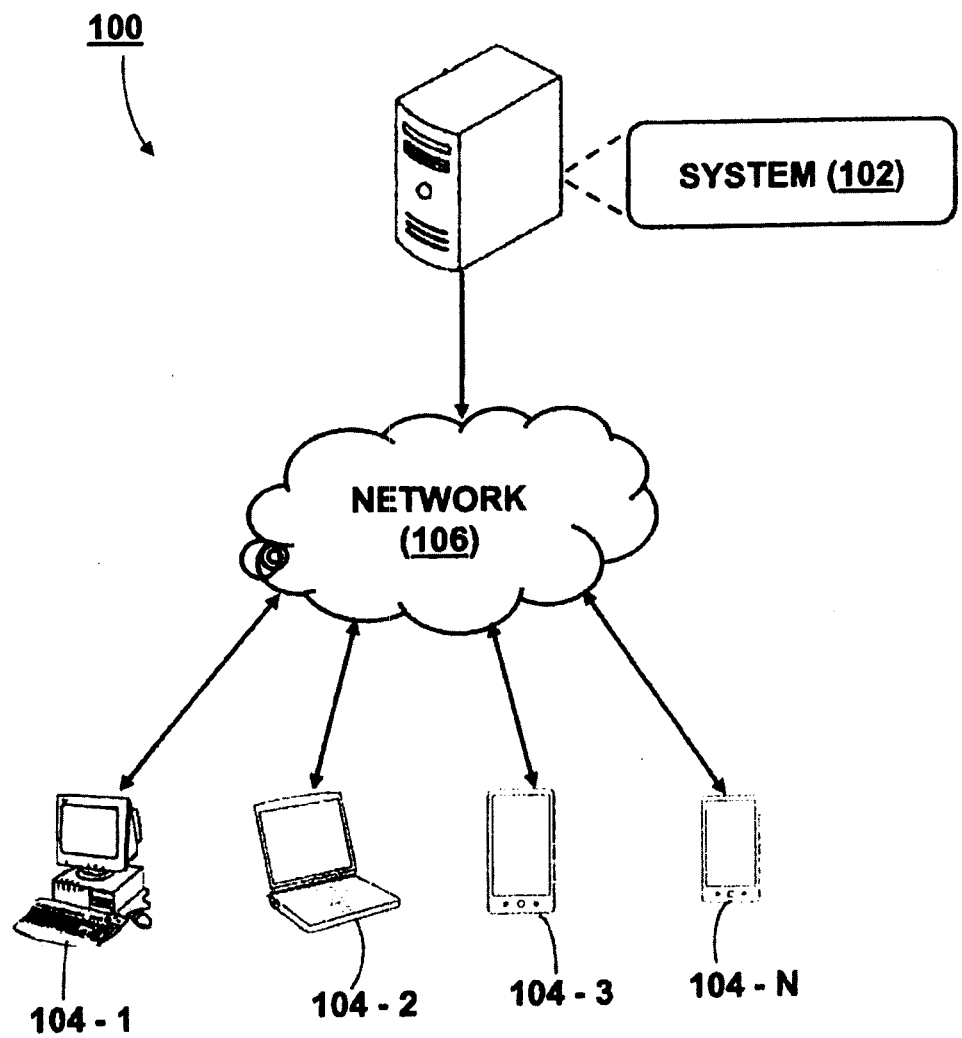
Figure 2:
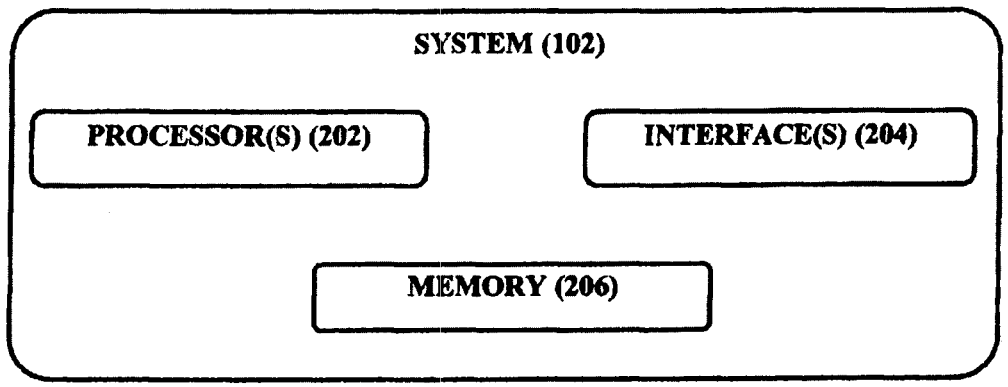
Figure 3:
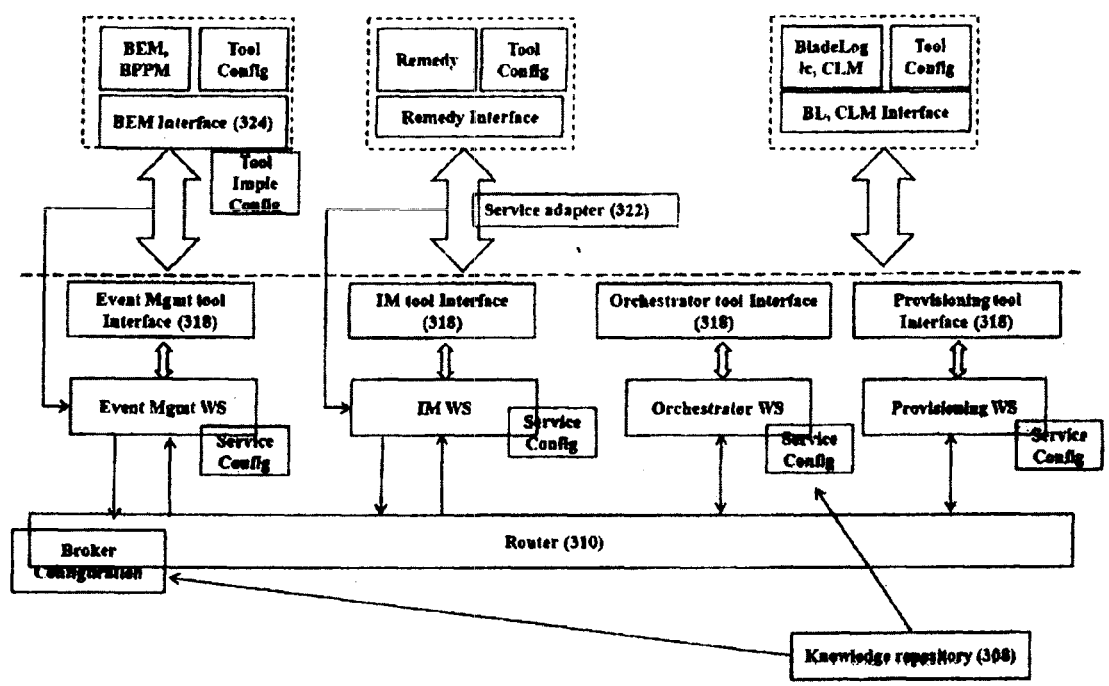
Figure 4:
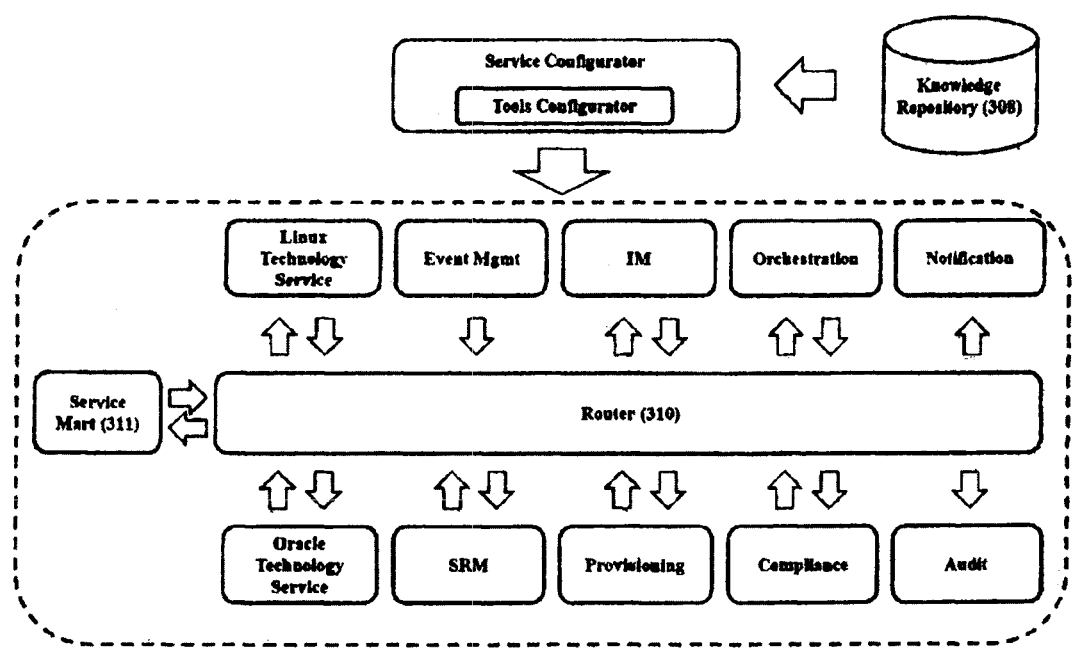
Figure 5:
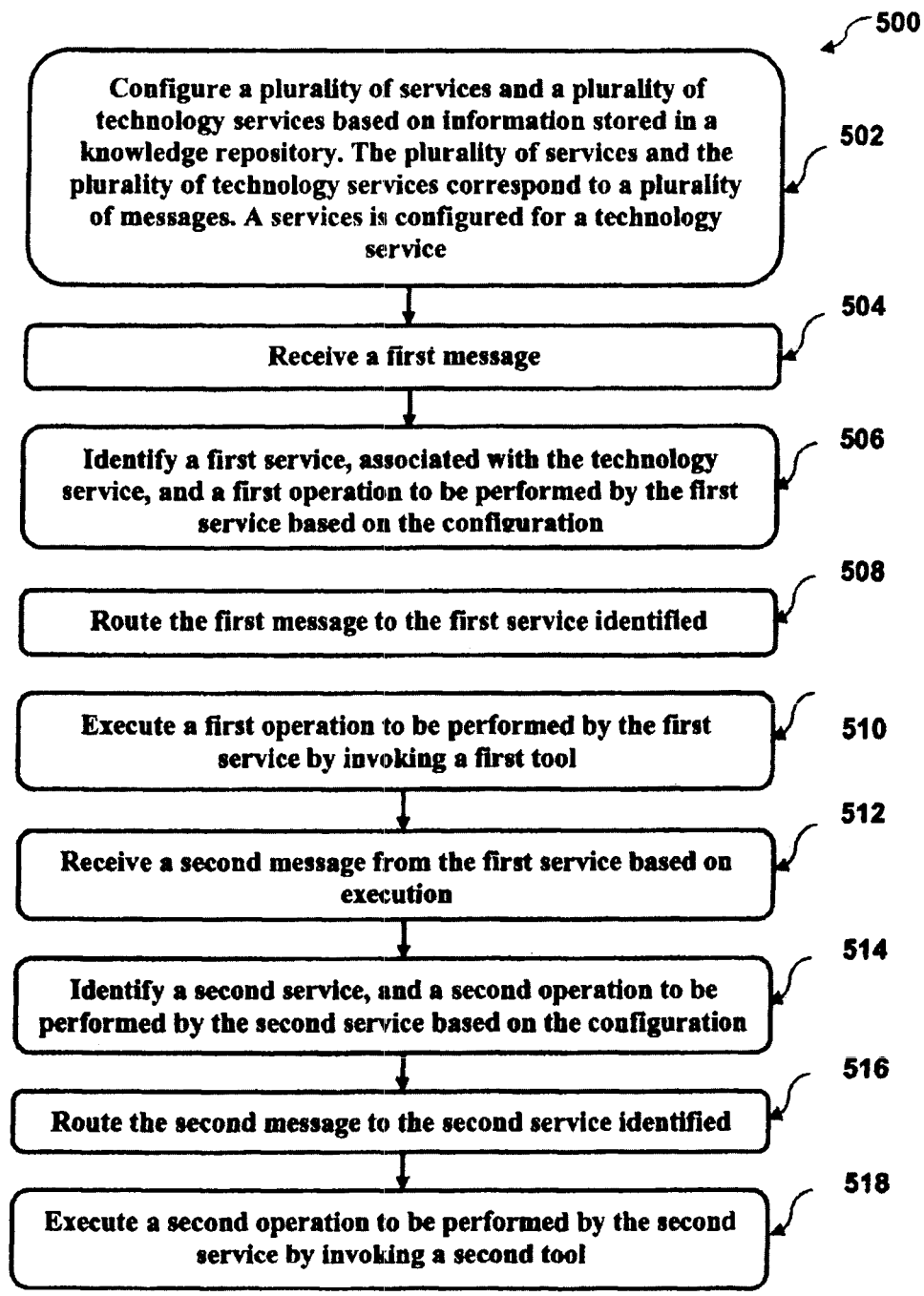

Referring now to FIG. 5, a method 500 for configuring and executing services is shown, in accordance with an embodiment of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described and is not intended to be construed as a limitation, and any number of the described method blocks can be combined in any order to implement the method 500 or alternate methods. Additionally, individual blocks may be deleted from the method 500 without departing from the spirit and scope of the disclosure described herein. Furthermore, the method may be implemented in any suitable hardware, software, firmware, or combination thereof. However, for ease of explanation, in the embodiments described below, the method 500 may be implemented in the above-described system 102.

At step/block 502, a plurality of services and a plurality of technology services may be configured. The plurality of services and the plurality of technology services are based on information stored in a knowledge repository. The plurality of services and the plurality of technology services may correspond to a plurality of messages. The at least one service is configured for at least one technology service. The configuration comprises transformation, validation and operation data associated with each service, a service adapter and a tool associated with each service. Further, the configuration comprises and to be performed by the each service by invoking the tool a plurality of operations corresponding to each service.

At step/block 504, a first message may be received. In one implantation, the first message may be received by the service mart 311.

At step/block 506, a first service associated with the technology service, and a first operation to be performed by the first service corresponding to the first message based on the configuration may be identified. In one implementation, the first service may be identified by the router 310.

At step/block 508, the first message may be routed to the first service. In one implementation, the first service may be routed by the router 310.

At step/block 510, a first operation may be executed by the first service. The first operation may be executed by invoking a first tool based on the configuration.

At step/block 512, a second message from the first service may be received based on the execution of the first operation. In one implementation, the router 310 may receive the second message.

At step/block 514, a second service, and a second operation to be performed by the second service corresponding to the second message based on the configuration may be identified. In one implementation, the second service may be identified by the router 310.

At step/block 516, the second message may be routed to the second service. In one implementation, the second service may be routed by the router 310.

At step/block 518, a second operation may be executed by the second service. The second operation may be executed by invoking a second tool based on the configuration.

Although implementations for methods and systems for configuring and executing services have been described in language specific to structural features and/or methods, it is to be understood that the appended claims are not necessarily limited to the specific features or methods described. Rather, the specific features and methods are disclosed as examples of implementations for configuring and executing services.

We claim:

1. A method for configuring and executing services, the method comprising:
    configuring a plurality of operational services and a plurality of technology services based on information stored in a knowledge repository, wherein the plurality of operational services and the plurality of technology services correspond to a plurality of messages, and wherein at least one operational service is configured for at least one technology service, wherein the configuration comprises:
    transformation, validation and operation data associated with each operational service, a service adapter and a tool associated with each operational service; and
    a plurality of operations to be performed by the each operational service by invoking the tool corresponding to each operational service;
    receiving, by a processor, a first message;
    identifying, by the processor, a first operational service among the plurality of operational services, associated with the technology service among the plurality of operational services, and a first operation to be performed by the first operational service based on the configuration;
    routing, by the processor, the first message to the first operational service identified;
    executing, by the processor, the first operation to be performed by the first operational service, wherein the first operation is executed by invoking a first tool, wherein the first tool is invoked based on the configuration;
    receiving, by the processor, a second message from the first operational service based on execution;
    identifying, by the processor, a second operational service among the plurality of operational services, and a second operation to be performed by the second operational service corresponding to the second message based on the configuration;
    routing, by the processor, the second message to the second operational service; and
    executing, by the processor, the second operation to be performed by the second operational service, wherein the second operation is executed by invoking a second tool, wherein the second tool is invoked based on the configuration.

2. The method of claim 1, wherein the plurality of operational services comprises an event management, an incident management, an orchestration service and a provisioning service.

3. The method of claim 1, wherein the technology service comprises at least one of an Oracle technology service and a Linux technology service.

4. The method of claim 2, wherein the first operational service comprises the event management, and the incident management.

5. The method of claim 2, wherein the second operational service comprises the orchestration service, the incident management and a combination thereof.

6. The method of claim 5, wherein when the first operational service is the incident management, the second operational service is the orchestration service, and wherein when the first operational service is the event management, the second operational service is the combination of the incident management and the orchestration service.

7. The method of claim 5, wherein the orchestration service defines a workflow to execute the second operation.

8. The method of claim 1, wherein the tools comprise at least one of BEM, Bladelogic, BPPM, CLM and Remedy.

9. A system for configuring and operating services, the system comprising:
   a processor; and
   a memory coupled to the processor, wherein the processor is capable of executing program instructions stored in the memory, to:
      configure a plurality of operational services and a plurality of technology services based on information stored in a knowledge repository, wherein the plurality of operational services and the plurality of technology services correspond to a plurality of messages, and wherein at least one operational service is configured for at least one technology service, wherein the configuration comprises:
   transformation, validation and operation data associated with each operational service, a service adapter and a tool associated with each operational service; and
   a plurality of operations to be performed by the each service by invoking the tool corresponding to each operational service;
      receive a first message;
      identify a first operational service associated with the technology service among the plurality of operational services, and a first operation to be performed by the first operational service based on the configuration;
      route the first message to the first operational service identified;
   execute the first operation to be performed by the first service, wherein the first operation is executed by invoking a first tool, wherein the first tool is invoked based on the configuration;
      receive a second message from the first operational service based on execution;
   identify a second operational service among the plurality of operational services, and a second operation to be performed by the second operational service corresponding to the second message based on the configuration;
      route the second message to the second operational service; and
   execute the second operation to be performed by the second service, wherein the second operation is executed by invoking a second tool, wherein the second tool is invoked based on the configuration.

10. The system of claim 9, wherein the plurality of operational services comprises an event management, an incident management, an orchestration service and a provisioning service.

11. The system of claim 9, wherein the technology service comprises at least one of an Oracle technology service and a Linux technology service.

12. The system of claim 10, wherein the first operational service comprises the event management and the incident management.

13. The system of claim 9, wherein the second operational service comprises the orchestration service, the incident management and a combination thereof.

14. The system of claim 13, wherein when the first operational service is the incident management, the second operational service is the orchestration service, and wherein when the first operational service is the event management, the second operational service is the combination of the incident management and the orchestration service.

15. The system of claim 13, wherein the orchestration service defines a workflow to execute the second operation.

16. A non-transitory computer readable medium embodying a program executable in a computing device for configuring and executing services, the program comprising:
   a program code for configuring a plurality of operational services and a plurality of technology services based on information stored in a knowledge repository, wherein the plurality of operational services and the plurality of technology services correspond to a plurality of messages, and wherein at least one operational service is configured for at least one a technology service, wherein the configuration comprises:
   transformation, validation and operation data associated with each operational service, a service adapter and a tool associated with each operational service; and
   a plurality of operations to be performed by the each operational service by invoking the tool corresponding to each operational service;
   a program code for receiving a first message;
   a program code for identifying a first operational service among the plurality of operational services associated with the technology service among the plurality of operational services, and a first operation to be performed by the first operational service based on the configuration;
   a program code for routing the first message to the first operational service identified;
   a program code for executing the first operation to be performed by the first operational service, wherein the first operation is executed by invoking a first tool, wherein the first tool is invoked based on the configuration;
   a program code for receiving a second message from the first operational service based on execution;
   a program code for identifying a second operational service among the plurality of operational services, and a second operation to be performed by the second operational service corresponding to the second message based on the configuration;
   a program code for routing the second message to the second operational service; and
   a program code for executing a second operation to be performed by the second operational service, wherein the second operation is executed by invoking a second tool, wherein the second tool is invoked based on the configuration.

* * * * *

UNITED STATES PATENT AND TRADEMARK OFFICE
CERTIFICATE OF CORRECTION

PATENT NO. : 9,436,486 B2
APPLICATION NO. : 14/542868
DATED : September 6, 2016
INVENTOR(S) : Deshmukh et al.

It is certified that error appears in the above-identified patent and that said Letters Patent is hereby corrected as shown below:

Please delete Patent 9,436,486 B2 in its entirety and insert Patent 9,436,482 B2 in its entirety as shown on the attached pages Signed and Sealed this
Eighth Day of November, 2016

Michelle K. Lee
*Director of the United States Patent and Trademark Office*

United States Patent
Deshmukh et al.

(10) Patent No.: US 9,436,486 B2
(45) Date of Patent: Sep. 6, 2016

(54) SYSTEM AND METHOD FOR CONFIGURING AND EXECUTING SERVICES

(71) Applicant: Tata Consultancy Services Limited, Mumbai, Maharashtra (IN)

(72) Inventors: Veena S. Deshmukh, Maharashtra (IN); Rahul Ramesh Kelkar, Maharashtra (IN); V. V. L. Sudha Kancharla, Maharashtra (IN); Mudit Dhagat, Maharashtra (IN)

(73) Assignee: Tata Consultancy Services Limited (IN)

( * ) Notice: Subject to any disclaimer, the term of this patent is extended or adjusted under 35 U.S.C. 154(b) by 81 days.

(21) Appl. No.: 14/542,868

(22) Filed: Nov. 17, 2014

(65) Prior Publication Data
US 2015/0143090 A1 May 21, 2015

(30) Foreign Application Priority Data
Nov. 15, 2013 (IN) .......................... 3241/MUM/2013

(51) Int. Cl.
*G06F 9/46* (2006.01)
*G06F 9/445* (2006.01)

(52) U.S. Cl.
CPC .................. *G06F 9/44505* (2013.01)

(58) Field of Classification Search
None
See application file for complete search history.

(56) References Cited

U.S. PATENT DOCUMENTS

| 8,402,473 | B1 * | 3/2013 | Becker ............... G06Q 10/067 719/313 |
| 2003/0120502 | A1 * | 6/2003 | Robb .................. G06Q 30/04 705/34 |
| 2007/0265860 | A1 * | 11/2007 | Herrmann ........... G06Q 10/087 705/26.1 |
| 2009/0193433 | A1 | 7/2009 | Maes |
| 2010/0293023 | A1 | 11/2010 | Senan et al. |
| 2013/0117195 | A1 * | 5/2013 | Mohanty ............. G06Q 10/067 705/348 |

FOREIGN PATENT DOCUMENTS

EP   2498209 A1   9/2012

OTHER PUBLICATIONS

"IT Service Management" www.itsm.info, 4 pages, Feb. 1, 2002.
Gorrissen Federspiel Kierkegaard, "Multi-vendor management", 53 pages, May 15, 2008.

* cited by examiner

*Primary Examiner* — H S Sough
*Assistant Examiner* — Kimberly Jordan
(74) *Attorney, Agent, or Firm* — Shumaker, Loop & Kendrick, LLP

(57) ABSTRACT

Systems and methods for configuring and performing operational services (OS) for a technology service (TS) corresponding to the received messages based on invoking the tools wherein the tools may be configured by translating the configuration of the services. The method includes: configuring the OS and executing the OS which further comprises the steps of identification of a first OS and a first operation based on the configuration, routing a first message received, executing the first operation by the first OS, routing the first message to the first OS identified. The first operation is performed by invoking a first tool wherein the first tool may send the first message to the router which further routes the first message to the OS with the first message eventually reaching the user via the TS. Similarly, a second operation may be performed by a second OS.

16 Claims, 5 Drawing Sheets

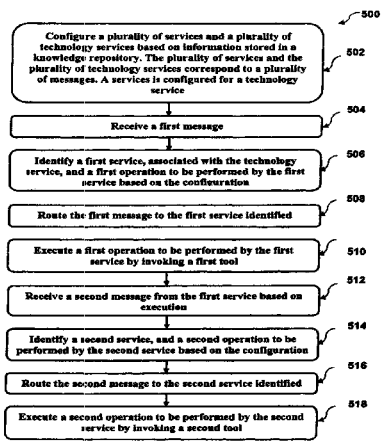

SYSTEM AND METHOD FOR CONFIGURING AND EXECUTING SERVICES

CROSS-REFERENCE TO RELATED APPLICATIONS

The present application claims priority to an Indian Provisional Patent Application No. 3241/MUM/2013, filed on Nov. 15, 2013, the entirety of which is hereby incorporated by reference.

FIELD OF THE INVENTION

The present disclosure relates to the field of information technology infrastructure production support. More particularly, the present disclosure relates to system(s) and method(s) for configuring and executing services in the information technology infrastructure.

BACKGROUND

Information Technology (IT) infrastructure production support comprises various operational services and technology services. The operational services may include event management, incident management, service request management, orchestration, provisioning etc. The operational services may span across various technology services. The technology services may include operating systems such as UNIX, Linux, and Windows, various Relational Database Management Systems (RDBMS) such as Oracle SQL server, various app servers, web servers and applications.

In general, the operational services need to be provided for each technology service. For example, the event management, the incident management needs to be provided using the technology service, such as UNIX. Typically, the operational services are offered by different tools. In order to provide interaction between two operational services, different tools may be integrated. The tools may belong to an organization using the operational services or to a contracted vendor who provides the operational services.

In a multivendor environment, different technology services and operations services are handled by different service providers. In the multivendor environment, there exist three entities. Firstly, organizations that need the services and may be outsourcing the services to another service provider. Secondly, a service vendor. Thirdly, tool vendors. The tools may be owned by the organization or the service vendor. The organizations are facing difficulties due to lack of flexibility with respect to selection of the service providers and the tool vendors in the currently prevailing scenario. For example, if the organization outsources a set of services to a service vendor and if the service vendor uses a set of tools that is integrated together, the organization may not be able to split the services between the vendors. The organizations may not be able to split the services as the tools might have been integrated with the services and splitting the services may disrupt business operations. Therefore, the organizations may get locked to the service vendor. As presented above, the tools may be owned by the organizations or the service vendors. If the tools or a tool suite is integrated, there is a lock-in with the tool vendor. There is no solution to address the difficulties faced by the organizations.

SUMMARY

This summary is provided to introduce concepts related to systems and methods for configuring and executing services and the concepts are further described below in the detailed description. As disclosed herein are systems and methods for configuring and executing services.

In one implementation, a method for configuring and executing services is disclosed. The method includes configuring a plurality of services and a plurality of technology services based on information stored in a knowledge repository. The plurality of services and the plurality of technology services correspond to a plurality of messages. The plurality of services include an event management, an incident management, an orchestration service and a provisioning service. The at least one service is configured for at least one technology service. The technology service includes at least one of an Oracle technology service and a Linux technology service. The configuration includes transformation, validation and operation data associated with each service, a service adapter and a tool associated with each service. Further, the configuration includes a plurality of operations to be performed by the each service by invoking the tool corresponding to each service. The method further includes receiving, by a processor, a first message. The method further includes identifying, by the processor, a first service associated with the technology service, and a first operation to be performed by the first service based on the configuration. The first service includes the event management or the incident management. The method further includes routing, by the processor, the first message to the first service identified. The method further comprises executing, by the processor, a first operation to be performed by the first service. The first operation is executed by invoking a first tool. The first tool is invoked based on the configuration. The method further includes receiving, by the processor, a second message from the first service based on execution. The method further includes identifying, by the processor, a second service, and a second operation to be performed by the second service corresponding to the second message based on the configuration. The second service includes the orchestration service, the incident management and a combination thereof. The orchestration service defines a workflow to execute the second operation. The method further includes routing, by the processor, the second message to the second service. The method further includes executing, by the processor, the second operation to be performed by the second service. The second operation is executed by invoking a second tool. The second tool is invoked based on the configuration.

In one implementation, a system for configuring and executing services is disclosed. The system includes a processor and a memory coupled to the processor. The processor is capable of executing program instructions stored in the memory. The processor executes the program instructions to configure a plurality of services and a plurality of technology services based on information stored in a knowledge repository. The plurality of services and the plurality of technology services correspond to a plurality of messages. The plurality of services includes an event management, an incident management, an orchestration service and a provisioning service. The at least one service is configured for at least one technology service. The technology service includes at least one of an Oracle technology service and a Linux technology service. The configuration includes transformation, validation and operation data associated with each service, a service adapter and a tool associated with each service. Further, the configuration comprises a plurality of operations to be performed by the each service by invoking the tool corresponding to each service. The processor further executes the program instructions to receive a first message. The processor further executes the program instructions to identify a first service associated with the technology service, and a first operation to be performed by the first service based on the configuration. The first service includes the event management, the incident management. The processor further executes the program instructions to route the first message to the first service identified. The processor further executes the program instructions to execute a first operation to be performed by the first service. The first operation is executed by invoking a first tool. The first tool is invoked based on the configuration. The processor further executes the program instructions to receive a second message from the first service based on execution. The processor further executes the program instructions to identify a second service, and a second operation to be performed by the second service corresponding to the second message based on the configuration. The second service includes the orchestration service, the incident management and a combination thereof. The orchestration service defines a workflow to execute the second operation. The processor further executes the program instructions to route the second message to the second service. The processor further executes the program instructions to execute a second operation to be performed by the second service. The second operation is executed by invoking a second tool. The second tool is invoked based on the configuration.

In one implementation, a non-transitory computer readable medium embodying a program executable in a computing device for configuring and executing services is disclosed. The program includes a program code for configuring a plurality of services and a plurality of technology services based on information stored in a knowledge repository. The plurality of services and the plurality of technology services correspond to a plurality of messages. The plurality of services includes an event management, an incident management, an orchestration service and a provisioning service. The at least one service is configured for at least one technology service. The technology service includes at least one of an Oracle technology service and a Linux technology service. The configuration includes transformation, validation and operation data associated with each service, a service adapter and a tool associated with each service. Further, the configuration includes a plurality of operations to be performed by the each service by invoking the tool corresponding to each service. The program further includes a program code for receiving a first message. The program further includes a program code for identifying a first service associated with the technology service, and a first operation to be performed by the first service based on the configuration. The first service includes the event management, the incident management. The program further includes a program code for routing the first message to the first service identified. The program further comprises a program code for executing a first operation to be performed by the first service. The first operation is executed by invoking a first tool. The first tool is invoked based on the configuration. The program further includes a program code for receiving a second message from the first service based on execution. The program further includes a program code for identifying a second service, and a second operation to be performed by the second service corresponding to the second message based on the configuration. The second service includes the orchestration service, the incident management and a combination thereof. The orchestration service defines a workflow to execute the second operation. The program further includes a program code for routing the second message to the second service. The program further includes a program code for executing a second operation to be performed by the second service. The second operation is executed by invoking a second tool. The second tool is invoked based on the configuration.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to refer like/similar features and components.

FIG. 1 illustrates a network implementation of a system for configuring and executing services, in accordance with an embodiment of the present disclosure.

FIG. 2 illustrates the system, in accordance with an embodiment of the present disclosure.

FIG. 3 and FIG. 4 illustrate a framework of the system, in accordance with an embodiment of the present disclosure.

FIG. 5 illustrates a method for configuring and executing services, in accordance with an embodiment of the present disclosure.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. Disclosed are systems and methods for configuring and executing services. In order to execute services, at first, a plurality of services and a plurality of technology services are configured. The plurality of services/operational services and the plurality of technology services may be configured based on information stored in a knowledge repository. The plurality of services and the plurality of technology services may correspond to a plurality of messages. The at least one service is configured for at least one technology service. In one example, the plurality of services may comprise at least one of an event management, an incident management, an orchestration service and a provisioning service. In one example, the plurality of technology services may comprise an Oracle technology service and a Linux technology service. Each service may offer a specific type of operations. For example, an Incident Management service may offer service operations such as 'create Incident(MsgObj)', 'update incident(MsgObj)', getStatus(Incident ID). The Message object may have open key-value based structure and may contains the inputs relevant to service operation.

The configuration comprises transformation, validation and operation data associated with each service, a service adapter and a tool associated with each service. Further, the configuration comprises. Further, the configuration comprises a plurality of operations corresponding to each service to be performed by the each service by invoking the tool.

After configuring the services, in order to execute the services, a first message may be received via a user interface. Based on the configuration, a first service associated with the technology service, and a first operation to be performed by the first service based on the configuration may be identified. After identifying the first service and the first operation, the first message may be routed. The first message may be routed based on subscription by the first service. After routing the first message, a first operation of the plurality of operations may be executed by the first service. The first operation may be executed by invoking a first tool based on the configuration. Subsequently, a second message may be received from the first service based on execution. The second message may comprise a status indicating completion of the first operation. Subsequently, a second service, and a second operation to be performed by the second service corresponding to the second message may be identified based on the configuration. The second service may comprise the orchestration service. The orchestration service may define a workflow to execute the second operation.

After identifying the second service and the second operation, the second message may be routed the second service. Subsequently, the second operation to be performed may be executed by the second service. The second operation may be executed by invoking a second tool. The second tool may be invoked based on the configuration. After executing the second operation, a status indicating completion of the second operation may be sent to the user.

The service or technology service may perform the operations specified in the message using a tool and may send results of the message to the router. After resolving the message in the tool, an orchestration service may execute required procedure on the message. The orchestration service may subscribe to the router to receive messages. Upon execution, the orchestration service may send the message with results to the router. Subsequently, the router may route the message to the operational service. Further, the operational service may set the message as closed. Subsequently, the operational service may send the message to the technology service. After receiving the message, the technology service may send the message to the user via the user interface.

While aspects of described system and method for configuring and executing services may be implemented in any number of different computing systems, environments, and/or configurations, the embodiments are described in the context of the following exemplary system.

Referring now to FIG. 1, a network implementation 100 of a system 102 for configuring and executing services is illustrated, in accordance with an embodiment of the present disclosure. Although the present disclosure is explained by considering a scenario that the system 102 is implemented as an application on a server. It may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2, 104-3, and 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, an Application Program Interface (API) and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, at first, a user may use the client device 104 to access the system 102 via the I/O interface 204. The working of the system 102 may be explained in detail using FIG. 2, FIG. 3, and FIG. 4 explained below. The system 102 may be used for configuring and executing services. In order to configure and execute services, the system 102 may provide a service integration framework for operational services and technology services.

At first, the system 102 may configure a plurality of the services and a plurality of technology services. In one implementation, the system 102 may configure the plurality of services and the plurality of technology services based on information stored in a knowledge repository 308. In order to explain the configuration of the plurality of services and the plurality of technology services, FIG. 3, and FIG. 4 may be used as an example. FIG. 3 and FIG. 4 illustrate the system 102 architecture comprising a framework to configure the services. Referring to FIG. 3, it may be observed that the framework comprises one or more layers showing various components. At level 1, the framework shows a router/service integration network 310. The router 310 may be accessed by using a service mart 311, as shown in FIG. 4. In one example, the service mart 311 may comprise a Graphical User Interface (GUI) to access the router 310. In one example, the service mart 311 may be a web interface.

In one implementation, the router 310 may interact with the plurality of services and a plurality of technology services. The at least one service may be configured for at least one technology service. In one implementation, the plurality of services may interact with each other through the router 310 in a publisher-subscriber model. The interaction between the plurality services may be asynchronous. Each service may have a service catalogue application program interface 318 at level 2. In one example, the plurality of services may comprise an event management, an incident management, an orchestration service and a provisioning service. The plurality of technology services may comprise an Oracle technology service and a Linux technology service. Each service and the technology service may be capable of sending the messages as per the operations associated with them. Further, each service and the technology service may expose a service catalogue application programme interface(API) 318. The service catalogue application program interface 318 for each service and the technology service may pertain to operations associated with the service and the technology service. For example, the incident management service may expose API for create incident and update incident. In another example, the orchestration service may expose API for start workflow. Each service may have an interface which may be used by other entities to invoke the operations of the service. In one example, the incident management service may have an Incident Management (IM) web interface 318. Similarly, the event management service may have an Event Management (EM) web interface 318. In one example, the service catalogue application program interface 318 may comprise a web service. In one example, the service catalogue application program interface 318 may be presented as a RESTful web service.

At level 3, the system 102 may comprise a service adapter 322. In one example, the service adapter 322 may act as an abstract tool interface for a tool. At level 4, the system 102 may comprise the tool specific interface 324 interacting with the service adapter 322.

To configure the plurality of services and the plurality of technology services, the system 102 may use the information stored in the knowledge repository 308. The plurality of services and the plurality of technology services may correspond to a plurality of messages. The message may comprise information of a source of the message, intended operation to be performed, parameters in a form of key-value pairs, and a payload required. Further, the message may have a message object. The message object may have an open key-value based structure and may contain inputs relevant to an operation to be performed.

A service of the plurality of services may subscribe to the system 102 to receive the message. For example, the service may subscribe to the message based on a type of message. For example, the incident management service may subscribe to the operations such as create Incident(MsgObj), update incident(MsgObj), and getStatus(Incident ID). Further, the plurality of services may be configured for a technology service. The technology service may comprise the Oracle technology service and the Linux technology service. In one example, the incident management service may be associated with the Linux technology service. In another example, the event management service may be associated with the Linux technology service. Similarly, one or more services may be associated with the Oracle technology service. In one implementation, the technology service may subscribe to the system 102 to receive the message. For example, the technology service may subscribe to the message based on a category of the message, a type of the message, an item and a summary, corresponding to the message.

In one implementation, the plurality of services and the plurality of technology services may be configured based on data associated with each service corresponding to transformation, validation and operation data associated with each service, a service adapter and a tool associated with each service. Further, the configuration comprises a plurality of operations corresponding to each service to be performed by the each service by invoking the tool. As discussed, the plurality of services may correspond to the plurality of messages. For every message, the data required corresponding to configuration may be checked. As presented above, each service may subscribe to the message based on the type of the message. For the message, the data corresponding to transformation required may be configured. Further, for each data field, corresponding values required to validate the data may be configured. Similarly, the service adapter for each service that may act as a medium between the service and the tool may be configured. Further, the information corresponding to the tools that may be invoked too perform the operations for each service may be configured.

In one implementation, each service may subscribe to the router 310 to consume the message. For example, a service may subscribe to a message based on the type of the message that may be consumed by the service. The service may consume the message by specifying a location such that the message may be routed to the location. For example, the incident management service may subscribe to the message NewEvenCreated. Likewise, each operational service may subscribe to the router 310 such that when a message is received, the router 310 may have knowledge of the operational service which may cater to the message.

Similarly, a technology service may subscribe to consume the message. For example, the Linux technology service may subscribe to the message based on type of message e.g., Linux service request. Likewise, each technology service may subscribe to the router 310 such that when a message is received, the router 310 may have knowledge of the service and the technology service which may cater to the message.

Further, the configuration may comprise a plurality of operations required to perform corresponding to each service. In order perform the plurality of operations; each service may have to invoke one or more tools. Based on the subscription, the information pertaining to each service invoking a tool to perform a plurality of operations may be stored in the configuration. In one example, the tools may comprise BEM, Bladelogic, BPPM, CLM and Remedy. In one implementation, the system 102 may store the information pertaining to the configurations in the knowledge repository 308. In one implementation, the knowledge repository 308 may be comprised in the memory 206. In another implementation, the knowledge repository 308 may be comprised in an external database (not shown).

After configuring the services, the services may be executed. In order to execute the services, the system 102 may receive a first message. The first message may comprise information of the source of the message, intended operation to be performed, parameters in the form of key-value pairs, and the payload required. In one implementation, the system 102 may receive the first message using a service mart 311, as shown in FIG. 4. In one example, the service mart 311 may be a web interface. After receiving the first message, the message may be consumed by the technology service. Based on the first message, consider the first message received is of the type of message e.g., Linux service request; the Linux technology service may be identified. The Linux technology service may send the first message to the router 310. The technology service may send the first message with information corresponding to a category of the message, type of the message, an item of the message and summary of the message (CTIS). For example, the technology service may send the information as shown in Table 1.

TABLE 1

Table 1: CTIS

| Category | Type | Item | Summary |
|---|---|---|---|
| Infra-structure Services-Linux | Linux-Issues | FTPIssue | FTPIssue |
| Infra-structure Services-Linux | Linux-Service Request | UserCreation | UserCreation |
| Blade | Provi-sioning | Provi-sioning | BLCLI_LinuxRHELProvision |
| Unknown Service | Linux RHEL aaS | Virtualization Management | BladeLogic Automated Provisioning |

The router 310 may comprise a router listener (not shown) to receive the first message from the technology service. After receiving the first message, the router listener may add the first message in a queue. Subsequently, the router 310 may process the first message in order of arrival in the queue.

Corresponding to the CTIS of the first message, the system 102 may identify a first service from the plurality of services based on the configuration. As discussed, each service may have subscribed to consume the plurality of messages and such configuration information may be stored. In one implementation, the router 310 may identify the first service. The first service may comprise incident management service and event management. Consider the incident management service subscribed to consume the first message. Based on the configuration, the router 310 may identify that the incident management service is subscribed to consume the first message. After identifying the first service, the router 310 may validate the first message corresponding to the configuration. For example, the router 310 may validate the operation data received corresponding to the first message. Further, the router 310 may validate the data values corresponding to data fields in the configuration.

Subsequently, the router 310 may route/direct the first message to the incident management service. In order to explain the routing of the first message, Table 2 may be used as an example. Specifically, Table 1 shows the router 310 configuration illustrating the routing of the first message.

TABLE 2

Table 2: Router configuration

| Message Type | Qname | URL | Base method | Method |
|---|---|---|---|---|
| MON_NewAlertCritical | IMService:RECV | http://localhost:8080/IncidentManagementWS/rest/ITSMRest | post | createIncident |
| MON_NewAlertNonCritical | ServiceDeskQ | ServiceDesk | post | createTicket |
| Service_Notify | Notify:RECV | http://localhost:8080/NotifyWS/rest/NotifyRest | post | sendNofication |
| IM_NewIncidentCreated | OR:RECV | http://localhost:8080/OrchestrationWS/rest/OrchestrationWS | post | startWorkFlow |

When the first message is received, the router 310 may check the type of the message. Corresponding to the type of the first message, the router 310 may identify the service that subscribed to receive the first message. Subsequently, the router 310 may identify the operations to be performed by the service corresponding to the message based on the configuration. Referring to Table 2, consider the type of the first message received is MON:newalertcritical. Based on the type of the first message, consider that the incident management service subscribed to receive the first message. The information corresponding to subscription may be retrieved from the configuration. After identifying the service, the operations that have to be performed may be identified from a method to be performed on the message. Consider for the above example, the operation to be performed is identified as create incident. Based on the service and the operation, the router may route the first message to a location subscribed by the service. The location information may be stored in a form of URL. For example, the location may be stored as http://localhost:8080/Incident-ManagementWS/rest/ITSMRest. Based on the location, the first message may be routed to a first service to perform the operation.

For example, consider the first message comprises the operation e.g., create incident. The router 310 may route the first message to the incident management service. The router 310 may route the first message with the CTIS comprising parameters associated with the first message based on the configuration. The router 310 may route the first message by calling the first service. In one implementation, the router 310 may call the API of the first service to perform appropriate operation. After the first message is routed, the first service may receive the first message comprising a first operation to be performed by the first service based on the configuration. Upon receiving the first message, the first service may execute the first operation. For example, the first operation may comprise creating incident. In order to execute/perform the first operation, the first service may have to invoke a first tool. The first service may invoke the first tool based on the configuration.

In order to invoke the first tool, the configuration corresponding to the first service may have to be translated into the tool specific configuration. In order to explain the first service configuration, Table 3 may be used as an example. Specifically, Table 3 shows the configuration of the first service.

TABLE 3

Table 3: Configuration of the services

| gCategory | gType | gItem | gSummary | Params |
|---|---|---|---|---|
| Infrastructure Services-Linux | Linux-Issues | FTPIssue | FTPIssue | Hostname |
| Infrastructure Services-Linux | Linux-Service Request | UserCreation | UserCreation | UserName |
| Blade Unknown Service | Provisioning Linux RHEL aaS | Provisioning Virtualization Management | BLCLI_LinuxRHELProvision BladeLogic Automated Provisioning | config_file_xml config_file_xml |

The configuration of the first service may have to be translated such that the tool understands the configuration. In order to translate, the first service may interact with the tool via the service adapter 322. The service adapter 322 may map the configuration to a tool specific configuration. The mapping of the configuration to the tool specific configuration is illustrated in Table 4.

Based on the configurations, the Remedy tool 324 may create the ticket i.e., using the CTIS as shown in Table 5. Although the example illustrates invoking the Remedy tool corresponding to the incident management service, it is apparent to persons skilled in the art to execute other operations by invoking other tools.

TABLE 4

Table 4: Translation of the configuration

| GCategory | GType | GItem | GSummary | Category | Type | Item | Summary |
|---|---|---|---|---|---|---|---|
| Infrastructure Services - Linux | Linux-Service Request | UserCreation | UserCreation | Infrastructure as a Service | Administration | New User Creation | New User Creation |
| Infrastructure Services - Windows | Windows-Service Request | UserCreation | UserCreation | Infrastructure as a Service | Administration | New User Creation | New User Creation |
| Infrastructure Services - Linux | Linux-Issues | FTPIssue | FTPIssue | Infrastructure Services-Linux | Linux-Issues | FTPIssue | FTPIssue |

After translating the configuration, the tool 324 may execute the first operation. For example, the first service identified is the incident management service and the first operation identified is creating user name. In order to create the user name, the incident management service may invoke Remedy tool 324. The configuration of the incident management service may be translated into the Remedy tool configuration. In order to illustrate the tool configuration, Table 5 may be used as an example. Specifically, Table 5 shows the Remedy tool configuration.

TABLE 5

Table 5: Remedy tool configuration

| Category | Type | Item | Summary | Params |
|---|---|---|---|---|
| Infrastructure Services-Linux | Linux-Issues | FTPIssue | FTPIssue | Hostname |
| Infrastructure Services-Linux | Linux-Service Request | UserCreation | UserCreation | UserName |
| Unknown Service | Linux RHEL aaS | Virtualization Management | BladeLogic Automated Provisioning | config_file_xml |
| Unknown Service | Oracle11g aaS | Virtualization Management | BladeLogic Automated Provisioning | config_file_xml |

In order to create the new user, the Remedy tool 324 may consider parameters associated with the configurations.

After the ticket is created in the Remedy tool 324, the first service i.e., incident management service may send a second message to the router 310. The first service may send the second message indicating completion of execution of the first operation. In one implementation, after creation of the user name in the tool, the Incident Management (IM) service may send the second message containing a ticket ID and details to the router 310. As discussed, one or more services may subscribe to the system 102 to consume the plurality of messages. In one implementation, a second service of the plurality of services may subscribe to consume the second message. The configuration of such second service may be stored in the knowledge repository 308. After receiving the second message, the router 310 may identify the second service corresponding to the second message based on the configuration. In one example, the second service may comprise the orchestration service. Based on the identification, the router 310 may route the second message to the second service i.e., the orchestration service.

For example, consider the first service identified is IM service to perform the first operation of create incident corresponding to the first message as shown in Table 2. Based on the first service identified, the router 310 may route the first message to IM service. In order to execute the first operation, the IM service may invoke Remedy tool. Upon executing the first operation, the IM service may send the second message indicating completion of the first operation to the router 310.

After the second message is routed, the second service may receive a second message. Based on the second message, the router 310 may identify the second service and a second operation to be performed by the second service based on the configuration. For example, consider the second message comprises that the IM service created new incident. For example, consider the orchestration service subscribed to receive the message type corresponding to created new incident. Based on the second message type, the router 310 may identify that the orchestration service subscribed to execute the operation corresponding to the second message. From Table 2, it may be observed that the operation to be performed is start workflow. After identifying the orchestration service and the second operation, the router 310 may route the second message to the orchestration service. The router 310 may make appropriate service operation call on the orchestration service. In order to execute/perform the second operation, the orchestration service may execute a plurality of workflows pre-defined based on the configuration. In one example, the orchestration service may invoke the second tool i.e., Bladelogic that connects to a remote host to execute the workflow. In order to invoke the second tool, the configuration corresponding to the second service may have to be translated into the tool specific configuration. The translation may be performed as explained above using Table 3. After the configuration is translated, the orchestration service may invoke the second tool to create the incident in the database.

Subsequent to the execution of the plurality of workflows, the orchestration service may send results based on the execution of the second operation corresponding to the second message. In one implementation, the orchestration service may send the results to the router 310. Further, the orchestration service may send a status message indicating that the second message is completed. After receiving the results, the router 310 may route the results and the status message to the first service e.g., the Incident Management (IM) service. Subsequently, the Incident Management (IM) service may set a status of the first message as closed and may send the results to the technology service e.g., the Linux technology service. Subsequently, the technology service may send the results to the service mart 311.

In one implementation, the Event Management (EM) service may receive the first message. After receiving the first message, the EM service may perform the first operation corresponding to the first message. For example, consider the first message comprises the first operation as create an alert. The EM service may execute the first operation and may create the alert by invoking a first tool. After the first operation is executed, the EM service may send the second message to the router 310 indicating that an alert has been created. The EM service may execute the first operation as explained in the description above.

After receiving the second message, the router 310 may identify the second service and the second operation corresponding to the subscription of the plurality of services. Based on the configuration, consider the incident management service is subscribed to execute the second operation e.g., create incident; the router 310 may make an appropriate call to the IM service. After identifying the IM service and second operation, the router 310 may route the second message to the IM service. The second operation may be executed using the description above. After execution of the second message, the IM service may send a third message to the router 310. Subsequently, the router 310 may identify a third service and a third operation corresponding to the subscription of the plurality of services. For example, consider the orchestration service subscribed to execute the third operation. The router 310 may route the third message to the orchestration service. The orchestration service may execute the plurality of workflows as explained above. Subsequently, the orchestration service may send the results to the router 310. Further, the orchestration service may send a status message indicating that the third message is completed. After receiving the results, the router 310 may route the results and the status message to the first service e.g., the Event Management (EM) service. Subsequently, the EM service may set a status of the first message as closed.

Although the system 102 is described as a standalone application implemented on a server or a standalone computing device, it may be apparent to those persons skilled in the art to implement each operational service, technology service, and router on two or more computing devices running simultaneously. Further, the tool may be implemented on an individual computing device. When the services run on different applications residing on two or more computing devices, each computing device may have respective at least one processor, at least one memory and at least one user interface to implement the system described herein.

The plurality of services, the plurality of technology services and the router 310 may be configured to provide Information Technology (IT) infrastructure production support with a knowledge repository. By configuring the plurality of services, the plurality of operations are vendor agnostic. In other words, the services may be configured without being dependent on the tools that are vendor specific. The plurality of services may be outsourced to different vendors/service providers. Further, by configuring the plurality of services, the tools required to execute the operations may be changed without difficulty. In order to change the tool, organizations may have to change the service adapter associated with the tool. Further, configuration of the plurality of services and the plurality of technology services facilitates in sustaining and maintaining of the Information Technology (IT) infrastructure production support.

Referring now to FIG. 5, a method 500 for configuring and executing services is shown, in accordance with an embodiment of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described and is not intended to be construed as a limitation, and any number of the described method blocks can be combined in any order to implement the method 500 or alternate methods. Additionally, individual blocks may be deleted from the method 500 without departing from the spirit and scope of the disclosure described herein. Furthermore, the method may be implemented in any suitable hardware, software, firmware, or combination thereof. However, for ease of explanation, in the embodiments described below, the method 500 may be implemented in the above-described system 102.

At step/block 502, a plurality of services and a plurality of technology services may be configured. The plurality of services and the plurality of technology services are based on information stored in a knowledge repository. The plurality of services and the plurality of technology services may correspond to a plurality of messages. The at least one service is configured for at least one technology service. The configuration comprises transformation, validation and operation data associated with each service, a service adapter and a tool associated with each service. Further, the configuration comprises and to be performed by the each service by invoking the tool a plurality of operations corresponding to each service.

At step/block 504, a first message may be received. In one implantation, the first message may be received by the service mart 311.

At step/block 506, a first service associated with the technology service, and a first operation to be performed by the first service corresponding to the first message based on the configuration may be identified. In one implementation, the first service may be identified by the router 310.

At step/block 508, the first message may be routed to the first service. In one implementation, the first service may be routed by the router 310.

At step/block 510, a first operation may be executed by the first service. The first operation may be executed by invoking a first tool based on the configuration.

At step/block 512, a second message from the first service may be received based on the execution of the first operation. In one implementation, the router 310 may receive the second message.

At step/block 514, a second service, and a second operation to be performed by the second service corresponding to the second message based on the configuration may be identified. In one implementation, the second service may be identified by the router 310.

At step/block 516, the second message may be routed to the second service. In one implementation, the second service may be routed by the router 310.

At step/block 518, a second operation may be executed by the second service. The second operation may be executed by invoking a second tool based on the configuration.

Although implementations for methods and systems for configuring and executing services have been described in language specific to structural features and/or methods, it is to be understood that the appended claims are not necessarily limited to the specific features or methods described. Rather, the specific features and methods are disclosed as examples of implementations for configuring and executing services.

We claim:

1. A method for configuring and executing services, the method comprising:
  configuring a plurality of operational services and a plurality of technology services based on information stored in a knowledge repository, wherein the plurality of operational services and the plurality of technology services correspond to a plurality of messages, and wherein at least one operational service is configured for at least one technology service, wherein the configuration comprises:
  transformation, validation and operation data associated with each operational service, a service adapter and a tool associated with each operational service; and
  a plurality of operations to be performed by the each operational service by invoking the tool corresponding to each operational service;
  receiving, by a processor, a first message;
  identifying, by the processor, a first operational service among the plurality of operational services, associated with the technology service among the plurality of operational services, and a first operation to be performed by the first operational service based on the configuration;
  routing, by the processor, the first message to the first operational service identified;
  executing, by the processor, the first operation to be performed by the first operational service, wherein the first operation is executed by invoking a first tool, wherein the first tool is invoked based on the configuration;
  receiving, by the processor, a second message from the first operational service based on execution;
  identifying, by the processor, a second operational service among the plurality of operational services, and a second operation to be performed by the second operational service corresponding to the second message based on the configuration;
  routing, by the processor, the second message to the second operational service; and
  executing, by the processor, the second operation to be performed by the second operational service, wherein the second operation is executed by invoking a second tool, wherein the second tool is invoked based on the configuration.

2. The method of claim 1, wherein the plurality of operational services comprises an event management, an incident management, an orchestration service and a provisioning service.

3. The method of claim 1, wherein the technology service comprises at least one of an Oracle technology service and a Linux technology service.

4. The method of claim 2, wherein the first operational service comprises the event management, and the incident management.

5. The method of claim 2, wherein the second operational service comprises the orchestration service, the incident management and a combination thereof.

6. The method of claim 5, wherein when the first operational service is the incident management, the second operational service is the orchestration service, and wherein when the first operational service is the event management, the second operational service is the combination of the incident management and the orchestration service.

7. The method of claim 5, wherein the orchestration service defines a workflow to execute the second operation.

8. The method of claim 1, wherein the tools comprise at least one of BEM, Bladelogic, BPPM, CLM and Remedy.

9. A system for configuring and operating services, the system comprising:
  a processor; and
  a memory coupled to the processor, wherein the processor is capable of executing program instructions stored in the memory, to:
    configure a plurality of operational services and a plurality of technology services based on information stored in a knowledge repository, wherein the plurality of operational services and the plurality of technology services correspond to a plurality of messages, and wherein at least one operational service is configured for at least one technology service, wherein the configuration comprises:
    transformation, validation and operation data associated with each operational service, a service adapter and a tool associated with each operational service; and a plurality of operations to be performed by the each service by invoking the tool corresponding to each operational service;
receive a first message;
identify a first operational service associated with the technology service among the plurality of operational services, and a first operation to be performed by the first operational service based on the configuration;
route the first message to the first operational service identified;
execute the first operation to be performed by the first service, wherein the first operation is executed by invoking a first tool, wherein the first tool is invoked based on the configuration;
receive a second message from the first operational service based on execution;
identify a second operational service among the plurality of operational services, and a second operation to be performed by the second operational service corresponding to the second message based on the configuration;
route the second message to the second operational service; and
execute the second operation to be performed by the second service, wherein the second operation is executed by invoking a second tool, wherein the second tool is invoked based on the configuration.

10. The system of claim 9, wherein the plurality of operational services comprises an event management, an incident management, an orchestration service and a provisioning service.

11. The system of claim 9, wherein the technology service comprises at least one of an Oracle technology service and a Linux technology service.

12. The system of claim 10, wherein the first operational service comprises the event management and the incident management.

13. The system of claim 9, wherein the second operational service comprises the orchestration service, the incident management and a combination thereof.

14. The system of claim 13, wherein when the first operational service is the incident management, the second operational service is the orchestration service, and wherein when the first operational service is the event management, the second operational service is the combination of the incident management and the orchestration service.

15. The system of claim 13, wherein the orchestration service defines a workflow to execute the second operation.

16. A non-transitory computer readable medium embodying a program executable in a computing device for configuring and executing services, the program comprising:
a program code for configuring a plurality of operational services and a plurality of technology services based on information stored in a knowledge repository, wherein the plurality of operational services and the plurality of technology services correspond to a plurality of messages, and wherein at least one operational service is configured for at least one a technology service, wherein the configuration comprises:
transformation, validation and operation data associated with each operational service, a service adapter and a tool associated with each operational service; and
a plurality of operations to be performed by the each operational service by invoking the tool corresponding to each operational service;
a program code for receiving a first message;
a program code for identifying a first operational service among the plurality of operational services associated with the technology service among the plurality of operational services, and a first operation to be performed by the first operational service based on the configuration;
a program code for routing the first message to the first operational service identified;
a program code for executing the first operation to be performed by the first operational service, wherein the first operation is executed by invoking a first tool, wherein the first tool is invoked based on the configuration;
a program code for receiving a second message from the first operational service based on execution;
a program code for identifying a second operational service among the plurality of operational services, and a second operation to be performed by the second operational service corresponding to the second message based on the configuration;
a program code for routing the second message to the second operational service; and
a program code for executing a second operation to be performed by the second operational service, wherein the second operation is executed by invoking a second tool, wherein the second tool is invoked based on the configuration.

* * * * *